US012746972B2

(12) United States Patent
Nagasawa

(10) Patent No.: US 12,746,972 B2
(45) Date of Patent: Sep. 29, 2026

(54) VEHICLE BODY FRONT STRUCTURE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 322 days.

(21) Appl. No.: 18/762,048

(22) Filed: Jul. 2, 2024

(65) Prior Publication Data

US 2025/0026406 A1 Jan. 23, 2025

(30) Foreign Application Priority Data

Jul. 18, 2023 (JP) ................................ 2023-116807

(51) Int. Cl.
*B60K 11/04* (2006.01)
*B62D 21/15* (2006.01)

(52) U.S. Cl.
CPC ............ *B62D 21/152* (2013.01); *B60K 11/04* (2013.01)

(58) Field of Classification Search
CPC ..... B62D 21/152; B62D 21/15; B62D 21/155
USPC ........................... 296/187.09, 187.1, 203.02
See application file for complete search history.

(56) References Cited

U.S. PATENT DOCUMENTS 8,567,856 B2 * 10/2013 Rawlinson et al. .... B60L 50/66 296/187.1

FOREIGN PATENT DOCUMENTS

JP 2015-168363 A 9/2015

* cited by examiner

*Primary Examiner* — Amy R Weisberg
(74) *Attorney, Agent, or Firm* — Smith, Gambrell & Russell, LLP

(57) ABSTRACT

A vehicle body front structure includes a front side frame, a lower side frame, a first crash box, a second crash box, and an inclined plate. The front side frame extends on a side of a power unit room in a front-rear direction of a vehicle body. The lower side frame extends in the front-rear direction of the vehicle body. The first crash box is provided at a front end of the front side frame. The second crash box is provided at a front end of the lower side frame. The inclined plate is fixed to the lower side frame immediately behind the second crash box. The inclined plate is inclined upward of the lower side frame and outward in a vehicle width direction in a state where at least a part of a plate surface of the inclined plate faces an outer surface of the front side frame.

5 Claims, 15 Drawing Sheets

VEHICLE BODY FRONT STRUCTURE

CROSS-REFERENCE TO RELATED APPLICATIONS

The present application claims priority from Japanese Patent Application No. 2023-116807 filed on Jul. 18, 2023, the entire contents of which are hereby incorporated by reference.

BACKGROUND

The present disclosure relates to a vehicle body front structure including a power unit room in a front portion of a vehicle body.

In general, a vehicle such as an automobile has a power unit room in a vehicle body front portion. A power unit such as an engine or an electric motor is mounted in the power unit room. Such a power unit is a rigid body. Thus, it is almost impossible to cause the power unit to absorb the impact at the time of the frontal collision of the vehicle. The power unit deforms the vehicle interior when retreating due to an impact at the time of a frontal collision. Therefore, the power unit room preferably absorbs the collision load at the time of the front collision in front of the power unit.

As a vehicle body front structure for alleviating a collision load at the time of a frontal collision, for example, a vehicle body front structure disclosed in Japanese Unexamined Patent Application Publication (JP-A) No. 2015-168363 is well known. The vehicle body front structure disclosed in JP-A No. 2015-168363 includes a pair of first crash boxes respectively coupled to a pair of side frames (front side frames), a pair of second crash boxes respectively coupled to a pair of lower members (lower side frames), a pair of left and right vertical columns coupling the first crash box and the second crash box, and a coupling member coupling the vertical columns to each other. The coupling member regulates displacement of the vertical columns outward in a width direction of the vehicle body and maintains support rigidity in an extending direction of the second crash box. Thus, the vehicle body front structure disclosed in JP-A No. 2015-168363 efficiently absorbs the collision load not only by the first crash box but also by the second crash box.

SUMMARY

An aspect of the disclosure provides a vehicle body front structure. The vehicle body front structure includes a front side frame, a lower side frame, a first crash box, a second crash box, and an inclined plate. The front side frame extends on a side of a power unit room in a front-rear direction of a vehicle body. The lower side frame extends in the front-rear direction of the vehicle body below the front side frame. The first crash box is provided at a front end of the front side frame. The second crash box is provided at a front end of the lower side frame. The inclined plate is fixed to the lower side frame immediately behind the second crash box. The inclined plate is inclined upward of the lower side frame and outward in a vehicle width direction in a state where at least a part of a plate surface of the inclined plate faces an outer surface of the front side frame in the vehicle width direction.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

In the technique disclosed in JP-A No. 2015-168363 described above, it may be difficult to suppress deformation of a power unit room due to a small-wrap frontal collision or the like. For example, when a large collision load locally acts on one side region of a front surface of a vehicle body due to the small-wrap frontal collision, it may be difficult to sufficiently absorb the collision load only by a first crash box and a second crash box present in one side region of the vehicle body. In such a case, it is difficult to sufficiently suppress deformation of the power unit room.

For example, in a vehicle body front structure in which a power unit for an electric vehicle is mounted, it is more difficult to suppress deformation of a power unit room at the time of the small-wrap frontal collision. That is, the power unit of the electric vehicle can be easily downsized as compared with a power unit using a reciprocating engine or the like. When the power unit is downsized, a lower side frame for supporting the power unit is disposed inside a front side frame in a vehicle width direction. Thus, the second crash box is disposed inside the first crash box in the vehicle width direction. The second crash box thus disposed has difficulty in sufficiently absorbing a collision load in the event of a small-wrap frontal collision. As a result, it is more difficult for a vehicle body front structure for an electric vehicle to sufficiently suppress deformation of the power unit room.

It is desirable to provide a vehicle body front structure capable of suppressing deformation of a power unit room in any collision of a full-wrap frontal collision and a small-wrap frontal collision.

Figure 1:
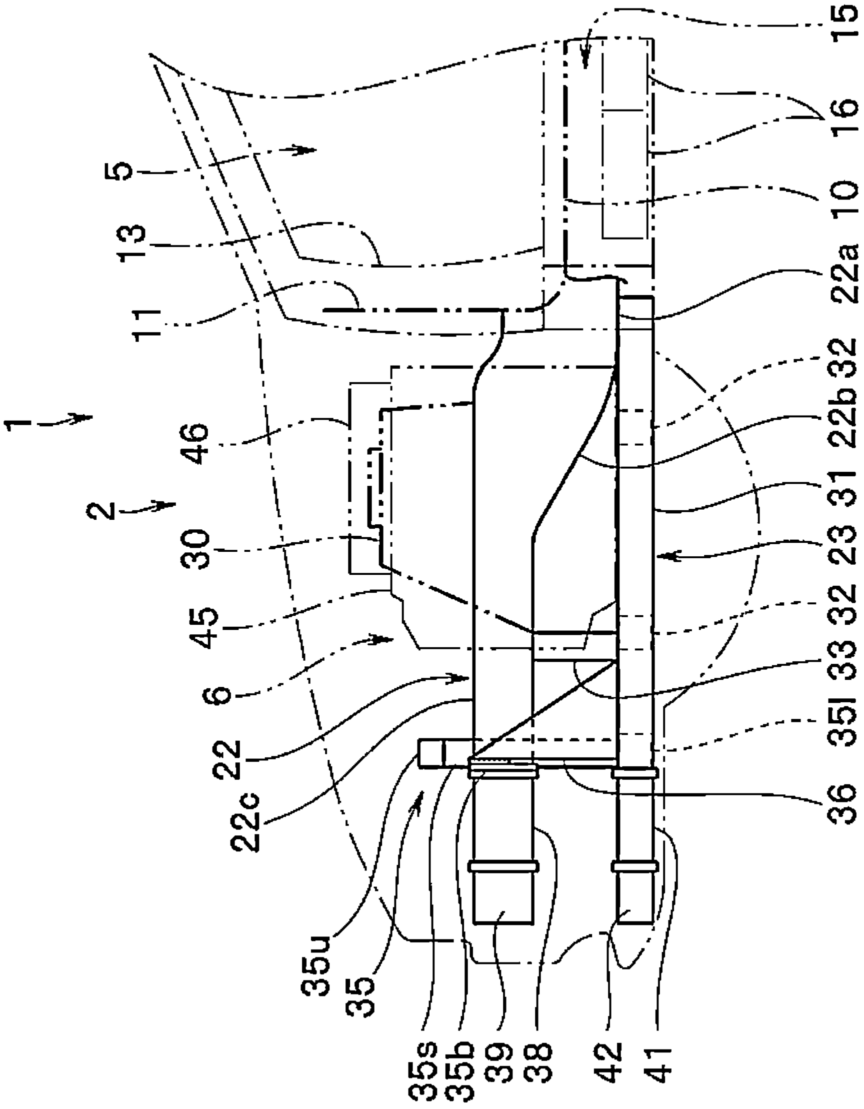
FIG. 1 is a side view illustrating a main part of a vehicle body front structure of an electric vehicle.
Figure 4:
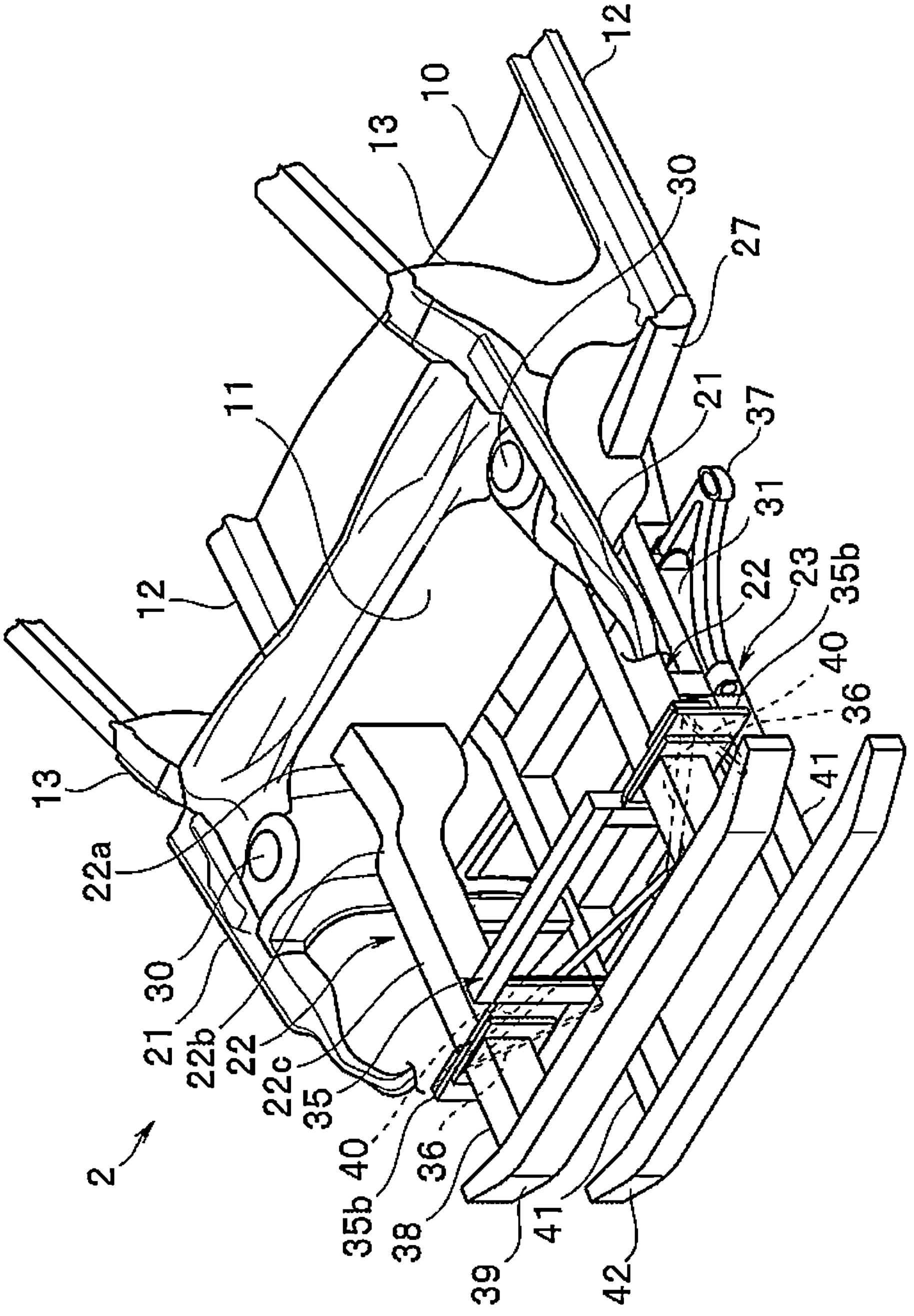
FIG. 4 is a perspective view illustrating the main part of the vehicle body front structure of the electric vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. As illustrated in FIGS. 1 and 4, a vehicle body 2 of a vehicle 1 such as an electric vehicle includes a cabin 5 and a motor room 6 as a power unit room.

The cabin 5 is provided substantially at a center portion of the vehicle body 2 in a front-rear direction. The vehicle body frame forming the cabin 5 includes a floor panel 10, a toe board 11, a pair of left and right side sills 12, and a pair of left and right front pillars 13.

The floor panel 10 is formed by, for example, a sheet metal member having a substantially flat plate shape. The floor panel 10 constitutes a floor surface of the cabin 5. A battery chamber 15 is provided below the floor panel 10. Batteries 16 is accommodated in the battery chamber 15.

The toe board 11 is formed by, for example, a sheet metal member having a shape standing upward from the front end of the floor panel 10. The toe board 11 constitutes a partition wall that partitions the cabin 5 and the motor room 6.

Each of the side sills 12 is, for example, a hollow member having a closed cross-sectional shape. These side sills 12 are configured by, for example, joining panels. Each of the side sills 12 extends in the front-rear direction of the vehicle body 2 on left and right side portions of the floor panel 10. Further, each of the side sills 12 is joined to the left and right side portions of the floor panel 10.

Each front pillar 13 is, for example, a hollow member having a closed cross-sectional shape. These front pillars 13 are configured by, for example, joining panels. A lower end portion of each front pillar 13 is joined to a front end of each side sill 12. Further, left and right side portions of the toe board 11 are joined to each front pillar 13.

The motor room 6 is provided in front of the cabin 5. A vehicle body frame forming the motor room 6 includes a pair of left and right upper side frames 21, a pair of left and right front side frames 22, and a cradle 23.

Each upper side frame 21 is formed by sheet metal, for example. Rear ends of the upper side frames 21 are joined to the front pillars 13. Thus, the upper side frames 21 extend in the front-rear direction of the vehicle body 2 above the left and right sides of the motor room 6.

Each front side frame 22 is, for example, a hollow member having a rectangular closed cross-sectional shape. These front side frames 22 are formed by joining panels, for example.

Each front side frame 22 has a rear region **22*a*, an inclined region 22*b*, and a front region 22*c*** along a longitudinal direction.

Each rear region **22*a* extends substantially horizontally toward the front of the vehicle body 2. The rear end of each rear region 22*a* is joined to the front end of each side sill 12 with, for example, each torque box 27 interposed therebetween. Thus, each rear region 22*a* can transmit an impact load transmitted from the front of the vehicle body 2 to the side sill 12 in the event of a frontal collision of the vehicle 1**.

Each inclined region **22*b* is inclined at a predetermined elevation angle from a front end of each rear region 22*a* toward the front of the vehicle body 2**.

Each front region **22*c* extends substantially horizontally from a front end of each inclined region 22*b* toward the front of the vehicle body 2**.

Figure 5:
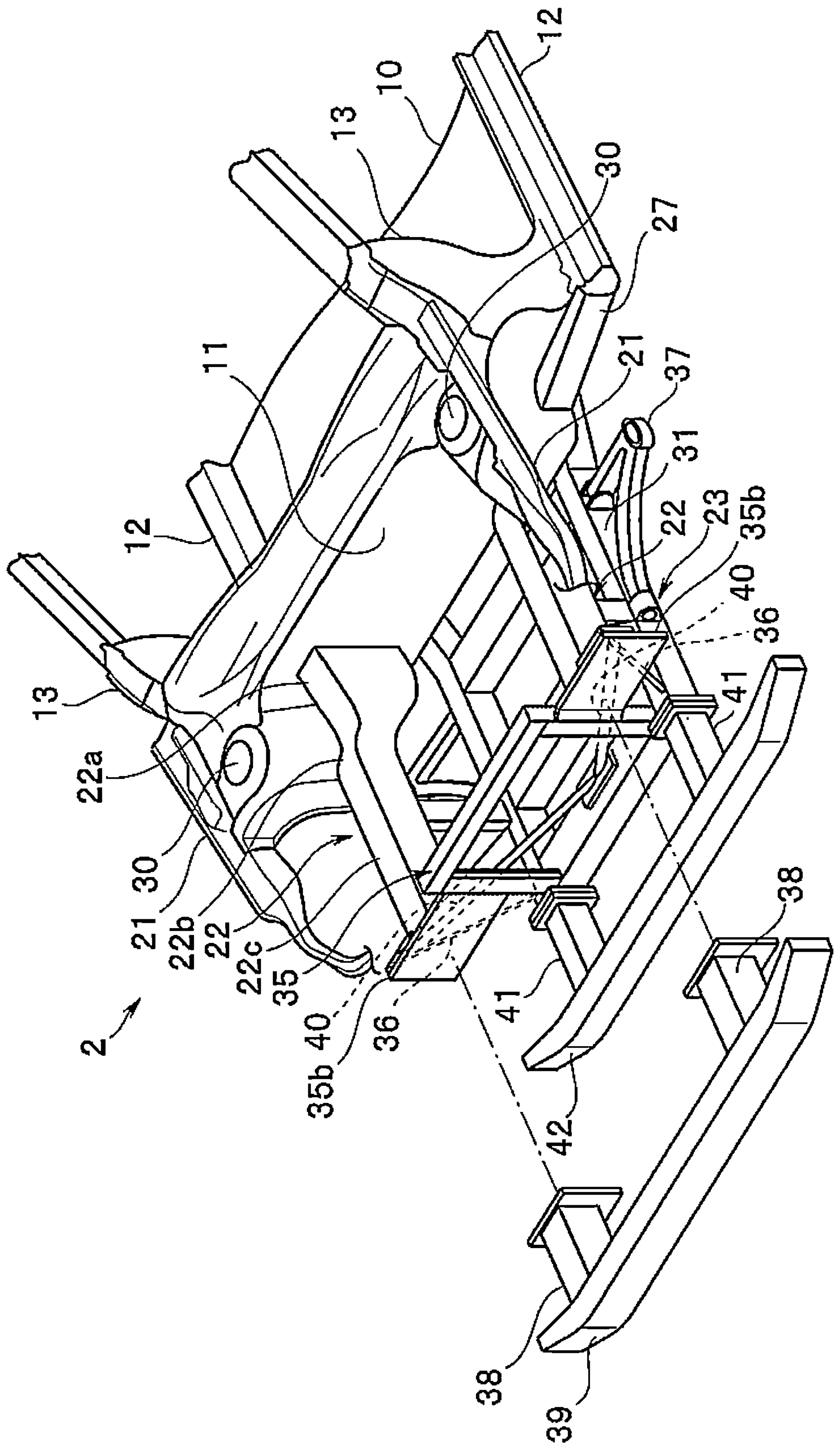
FIG. 5 is a perspective view illustrating a main part of an electric vehicle from which a bumper beam is removed.

As illustrated in FIG. 5, a suspension tower 30 is provided between each upper side frame 21 and each front side frame 22. A part of each suspension tower 30 is formed permanently integrally with each upper side frame 21 and each front side frame 22.

Figure 6:
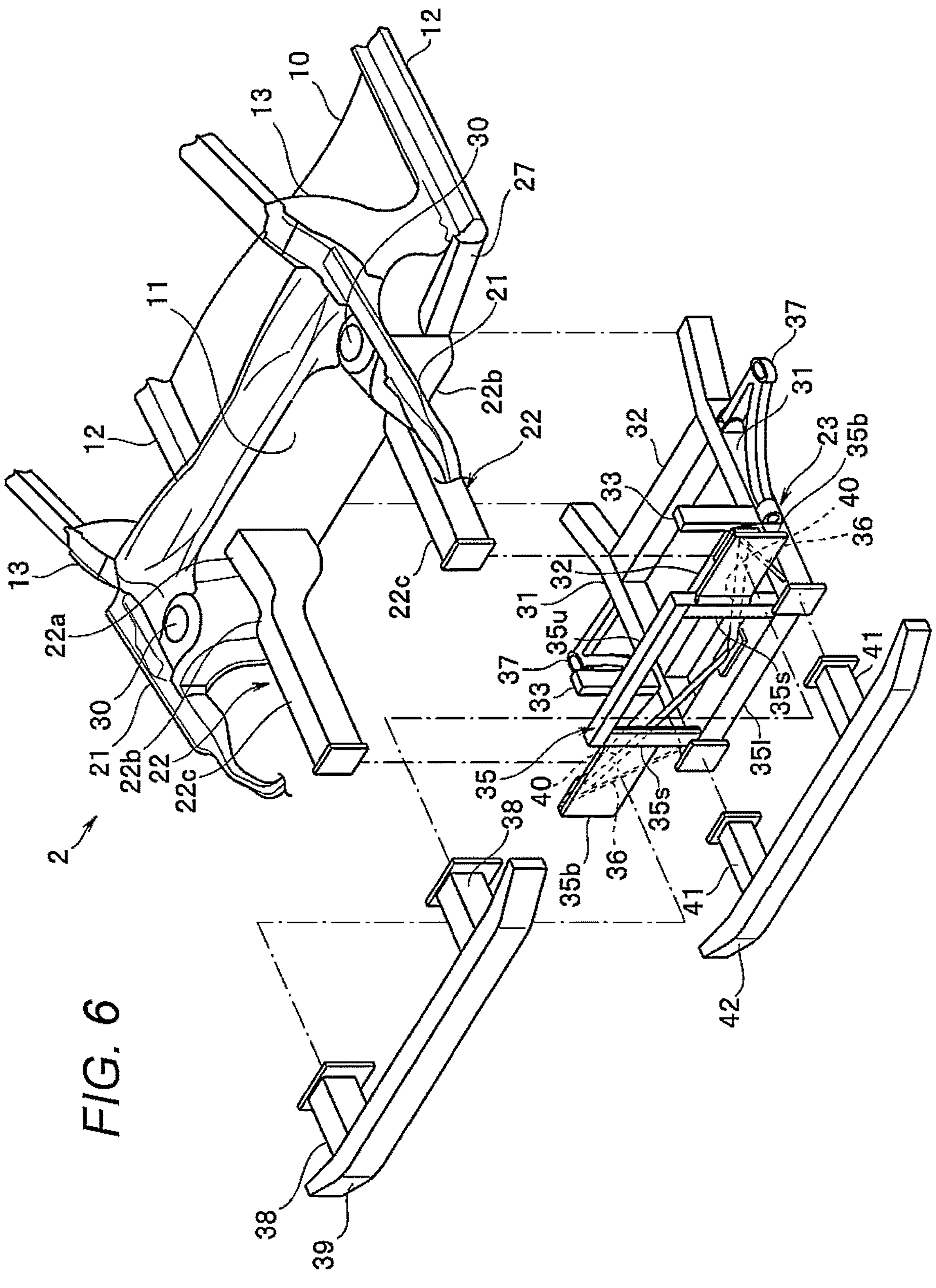
FIG. 6 is an exploded perspective view illustrating the main part of the vehicle body front structure of the electric vehicle.

As illustrated in FIGS. 1 and 6, the cradle 23 includes, for example, a pair of left and right lower side frames 31 and a pair of front and rear cross members 32.

Each lower side frame 31 is, for example, a hollow member having a rectangular closed cross-sectional shape. Each lower side frame 31 is formed by joining panels, for example. The lower side frames 31 extend in the front-rear direction of the vehicle body 2.

Figure 2:
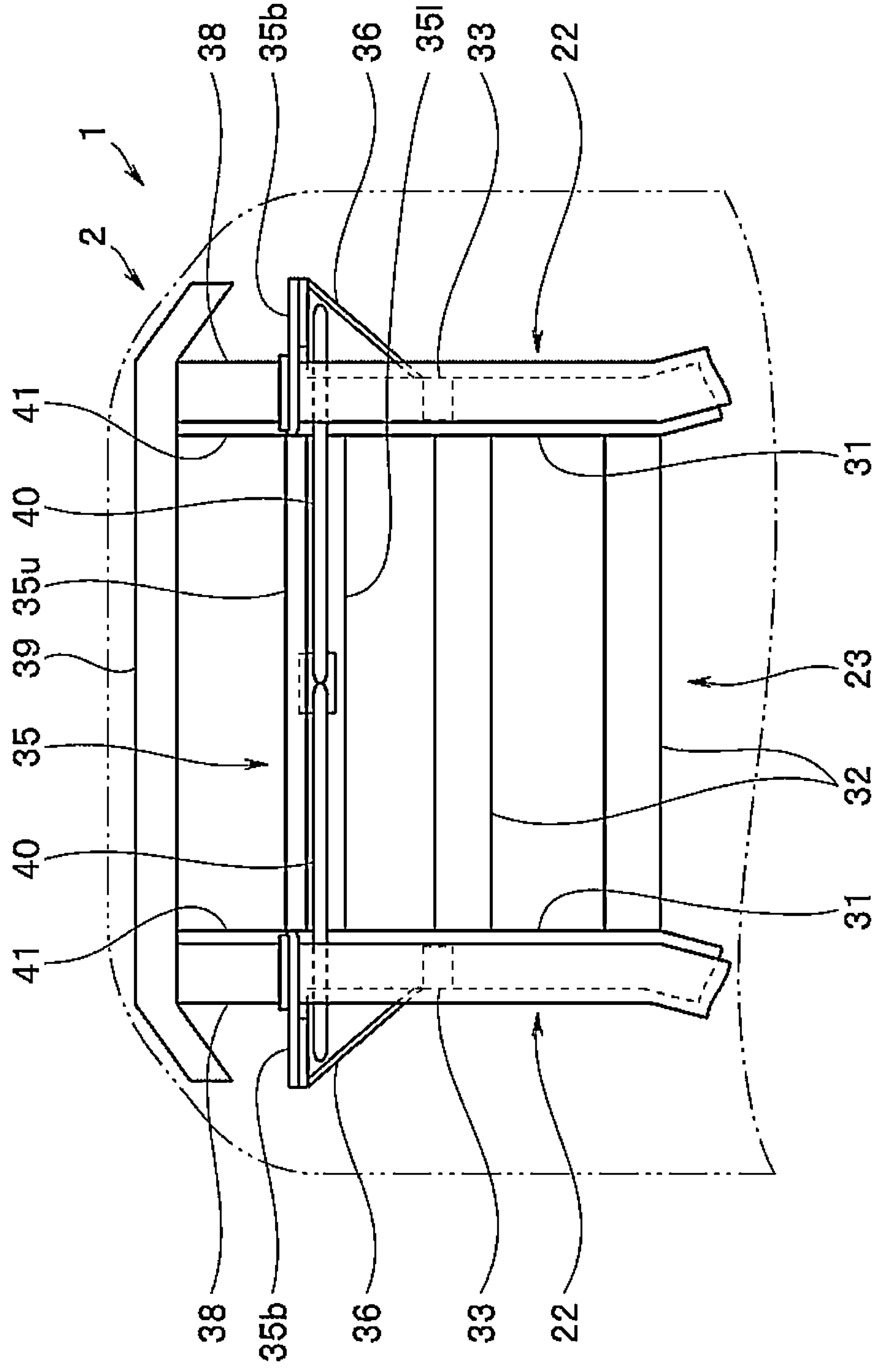
FIG. 2 is a plan view illustrating the main part of the vehicle body front structure of the electric vehicle.

For example, as illustrated in FIG. 2, the distance between the lower side frames 31 in the vehicle width direction is set narrower than the distance between the pair of front side frames 22. Each lower side frame 31 is disposed at a position where a part of an outer region of each lower side frame 31 in the vehicle width direction overlaps each front side frame 22 in a vertical direction.

Note that a suspension arm 37 is coupled to an outer surface of each lower side frame 31 in the vehicle width direction (see FIGS. 4 to 6). Thus, each suspension arm 37 is supported by the cradle 23 so as to be swingable in the vertical direction.

Each cross member 32 is, for example, a hollow member having a closed cross-sectional shape. These cross members 32 are formed by joining panels, for example. Each cross member 32 extends in the vehicle width direction with a predetermined interval in the front-rear direction of the vehicle body.

The left and right ends of each cross member 32 are joined to a middle of each lower side frame 31. Thus, each lower side frame 31 and each cross member 32 constitute the cradle 23 for supporting the power unit 45 such as a motor and the control unit 46 on the vehicle body 2.

As illustrated in FIGS. 1 to 5, the cradle 23 configured as described above is joined to a lower portion of each front side frame 22. For example, a rear region of each lower side frame 31 constituting the cradle 23 is joined to the rear region **22*a* of each front side frame 22. Further, a middle portion of each lower side frame 31 is joined to the front region 22*c* of each front side frame 22 with the columnar reinforcing member 33 interposed therebetween. As illustrated in FIG. 1, the reinforcing member 33 has, for example, a prismatic shape. The reinforcing member 33 is preferably joined to a front portion of the suspension tower 30**.

In the state where the cradle 23 is joined to each front side frame 22 in this manner, a front end of each lower side frame 22 is disposed at a vehicle body front-rear position substantially equivalent to the front end of each front side frame 31 (see FIGS. 1, 2, and 5). That is, each lower side frame 31 extends toward the front side of the vehicle body in front of each cross member 32 provided in the cradle 23. In other words, a front region of each lower side frame 31 is set longer than the length necessary for supporting the power unit 45 and the like.

A radiator support 35 is attached to an inner side of the front end of each lower side frame 31. Further, an inclined plate 36 is provided in the front region (extending portion) of each lower side frame 31 outside the radiator support 35 in the vehicle width direction.

The radiator support 35 is a frame body for supporting a radiator core (not illustrated) in a front portion of the motor room 6. The radiator support 35 includes a radiator lower frame 351, a radiator upper frame 35*u*, and a pair of left and right radiator side frames 35*s*.

The radiator lower frame 351 extends in the vehicle width direction at the front end of each lower side frame 31. The left and right ends of the radiator lower frame 35*l* are joined to the front end of each lower side frame 31. Accordingly, in the cradle 23, the radiator lower frame 351 forms what is called a ladder structure together with the pair of front and rear cross members 32 and the pair of left and right lower side frames 31.

The radiator upper frame 35*u* extends in the vehicle width direction above the radiator lower frame 351. The radiator upper frame 35*u* is coupled to the radiator lower frame 351 with a pair of radiator side frames 35*s* interposed therebetween. That is, both left and right ends of the radiator lower frame 351 and the radiator upper frame 35*u* are coupled to a pair of radiator side frames 35*s* interposed therebetween.

Each radiator side frame 35*s* is provided with a bracket 35*b*. Each bracket 35*b* is formed by, for example, a flat plate member extending outward in the vehicle width direction.

A front end of each front side frame 22 is joined to the rear surface of each bracket 35*b*. Further, a first crash box 38 protruding forward from the vehicle body 2 is joined to the front face of each bracket 35*b*. Each first crash box 38 is disposed at a position continuous with each front side frame 22 with each bracket 35*b* interposed therebetween. Furthermore, a bumper beam 39 extending in the vehicle width direction is joined to the front end of each first crash box 38.

Each inclined plate 36 is formed by a thick plate member formed by metal having predetermined rigidity. As illustrated in FIG. 1, each inclined plate 36 is formed by, for example, a flat plate having a right triangular shape.

Figure 3:
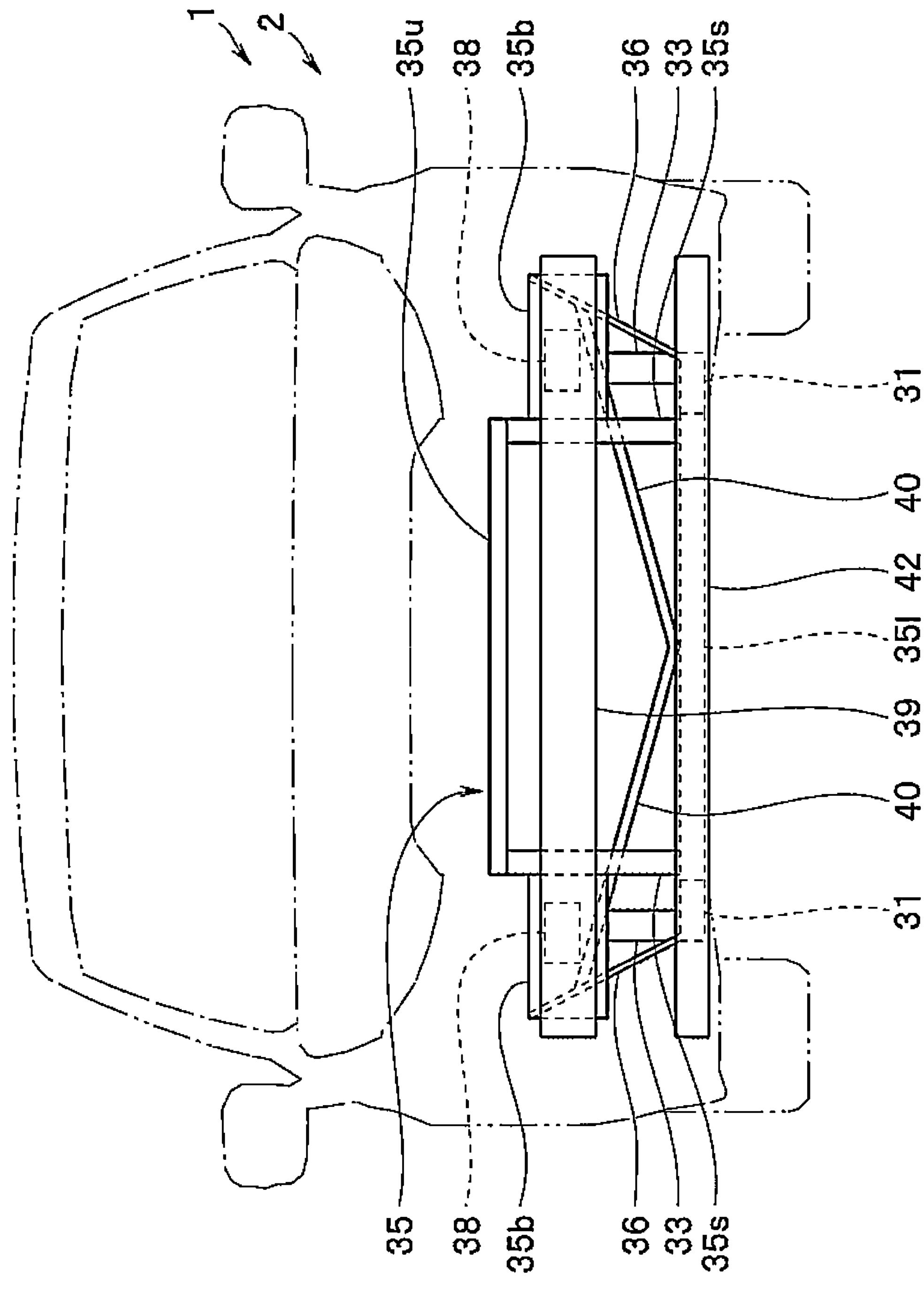
FIG. 3 is a front view illustrating the main part of the vehicle body front structure of the electric vehicle.

Each inclined plate 36 is disposed in the front region of each lower side frame 31 in a state where a bottom side portion extends along the front-rear direction of the vehicle body 2 (see FIGS. 1 and 2). That is, the inclined plate 36 is disposed in the front region of each lower side frame 31 at front and rear positions of the vehicle body 2 immediately behind the first crash boxes 38. Further, each inclined plate 36 is disposed so as to be inclined upward of the lower side frame 31 and outward in the vehicle width direction in a state where at least a part of the plate surface of each inclined plate 36 faces the outer surface of each front side frame 22 in the vehicle width direction (see FIGS. 2 to 4). Furthermore, for example, as illustrated in FIG. 3, each inclined plate 36 is preferably disposed at a position where at least a part thereof is hidden by the bumper beam 39 when the vehicle body 2 is viewed from the front.

The bottom side portion of each inclined plate 36 disposed as described above is fixed to the front region of each lower side frame 31 by welding or the like. Further, a top portion of each inclined plate 36 is fixed to each bracket 35*b* outside each front side frame 22 in the vehicle width direction. Further, a top portion side of each inclined plate 36 is coupled to the radiator lower frame 351 with, for example, a pipe-shaped stay 40 interposed therebetween. Thus, each inclined plate 36 is firmly fixed to the front portion of the vehicle body 2.

Here, by inclining as described above, each inclined plate 36 can be fixed to the lower side frame 31 without interfering with the front wheel at the time of steering.

Note that the shape of each inclined plate 36 is not limited to the right triangular shape. For example, as the shape of each inclined plate 36, various triangular shapes, trapezoidal shapes, rectangular shapes, or the like can be employed. However, the shape of each inclined plate 36 is preferably a tapered shape from the side of the bottom side portion toward the top portion side.

The second crash box 41 is joined to the front end of each lower side frame 31 to which each inclined plate 36 is fixed in this manner. That is, each second crash box 41 is positioned immediately in front of each inclined plate 36. Further, a lip spoiler 42 extending in the vehicle width direction is joined to the front end of each second crash box 41.

Next, operation of the vehicle body 2 at a time of a full-wrap frontal collision will be described.

Figure 7:
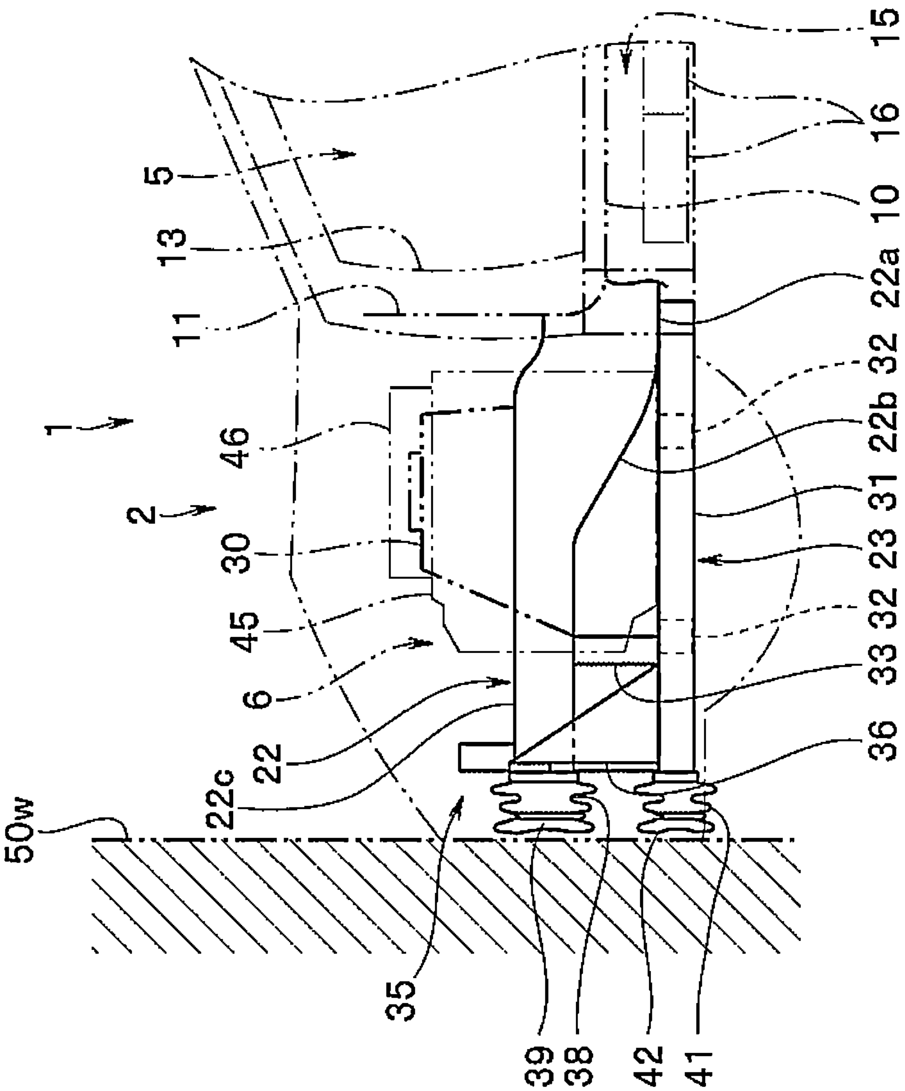
FIG. 7 is a side view illustrating the behavior of the vehicle body front structure at an initial stage at a time of a full-wrap frontal collision.

For example, as illustrated in FIG. 7, at an initial stage of the full-wrap frontal collision, the bumper beam 39 and each first crash box 38 are crushed (buckled and deformed) by an impact of a wall-like obstacle 50*w*. At the same time, the lip spoiler 42 and the second crash box 41 are crushed (buckled and deformed) by the collision of the wall-like obstacle 50*w*.

Figure 8:
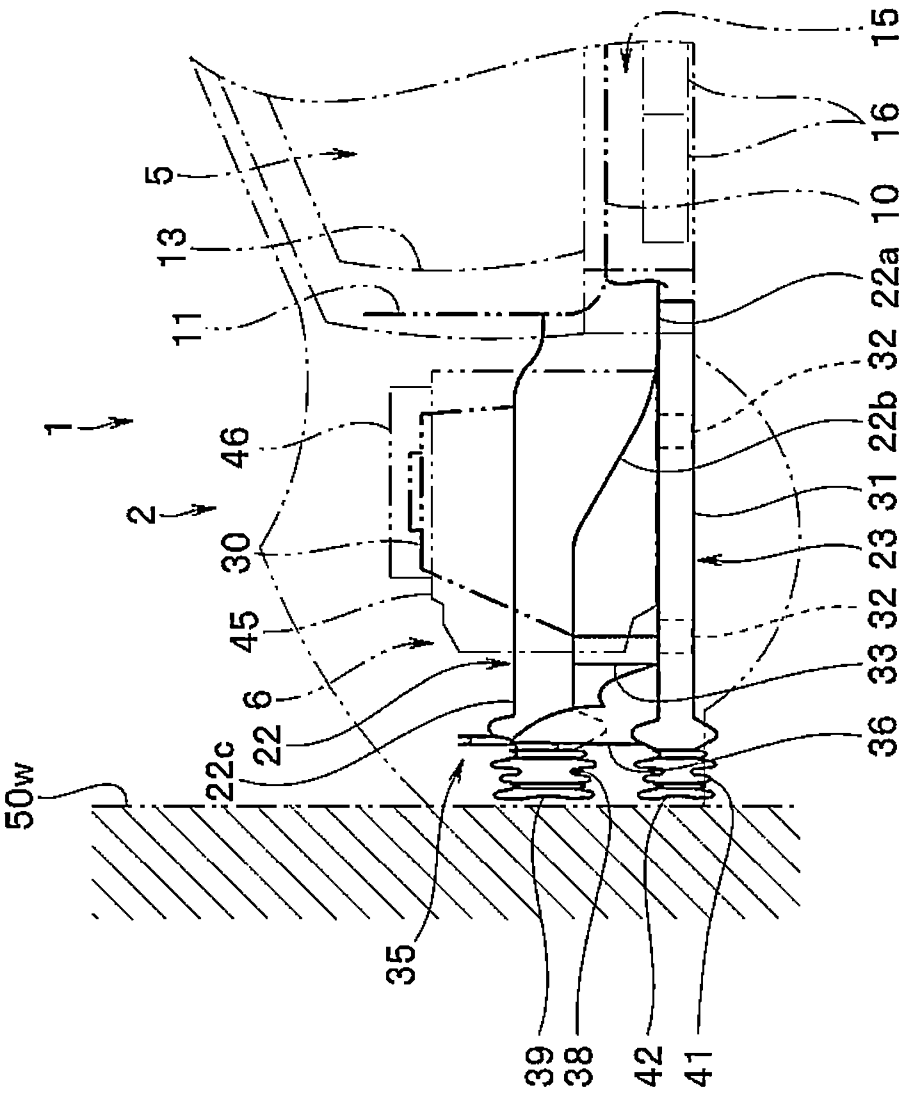
FIG. 8 is a side view illustrating a behavior of the vehicle body front structure at a middle stage at the time of the full-wrap frontal collision.

At a subsequent middle stage of the collision, for example, as illustrated in FIG. 8, crushing (buckling deformation) of the front region 22*c* of each front side frame 22 and the front region of each lower side frame 31 of the cradle 23 starts. Due to the crushing of the front region of the lower side frame 31, a collision load is transmitted to the bottom side portion of each inclined plate 36. Thus, the inclined plates 36 are deformed together with the lower side frame 31, and inhibition of crash stroke by the inclined plates 36 is suppressed.

Figure 9:
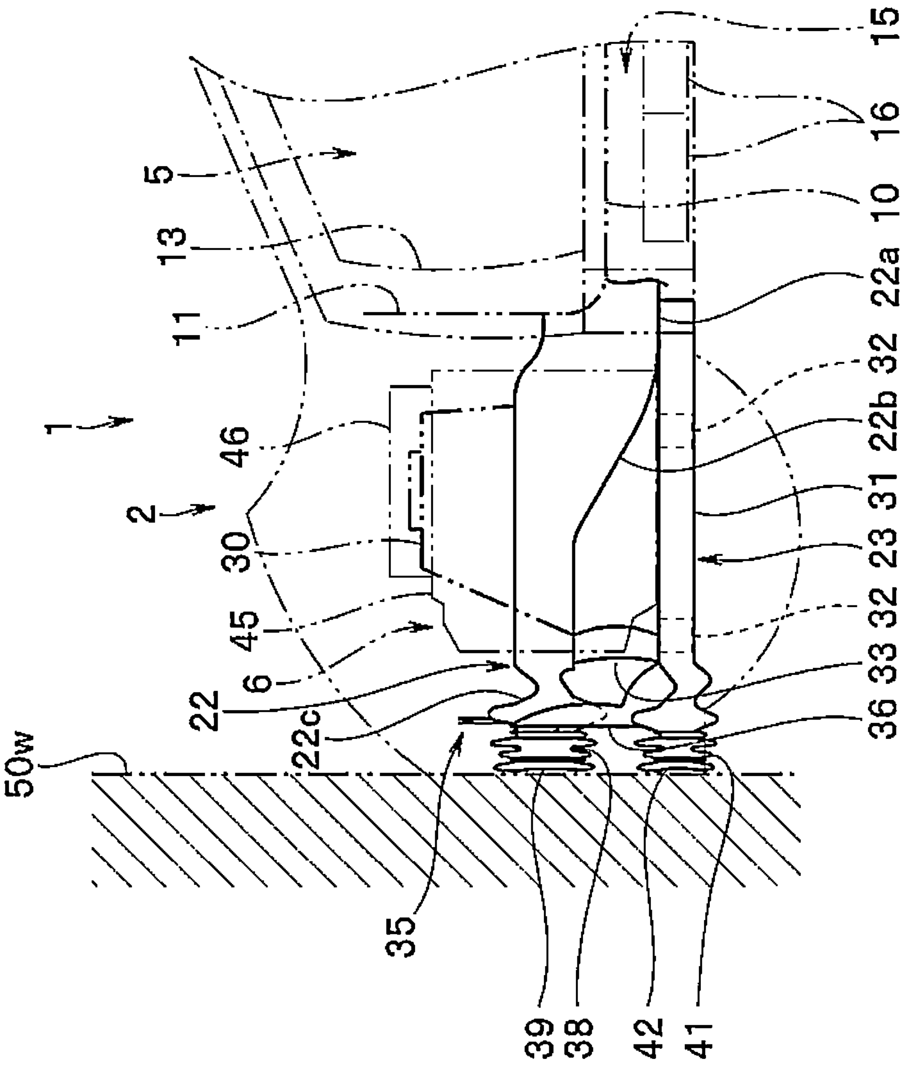
FIG. 9 is a side view illustrating the behavior of the vehicle body front structure at a final stage of the full-wrap frontal collision.

At a subsequent final stage of the collision, for example, as illustrated in FIG. 9, crushing of each front side frame 22 and each lower side frames 31 progresses.

In this case, the rear portion of each lower side frame 31 is coupled to each front side frame 22. Further, the middle portion of each lower side frame 31 is coupled to each front side frame 22 with the reinforcing member 33 interposed therebetween. Thus, each lower side frame 31 generates a reaction force in the front region of the motor room 6 without retreating to the rear side of the vehicle body 2 at the time of the front collision. Accordingly, the lower side frames 31 cooperate with the front side frames 22 to suppress deformation of the motor room 6.

Next, operation at a time of the small-wrap frontal collision will be described.

Figure 10:
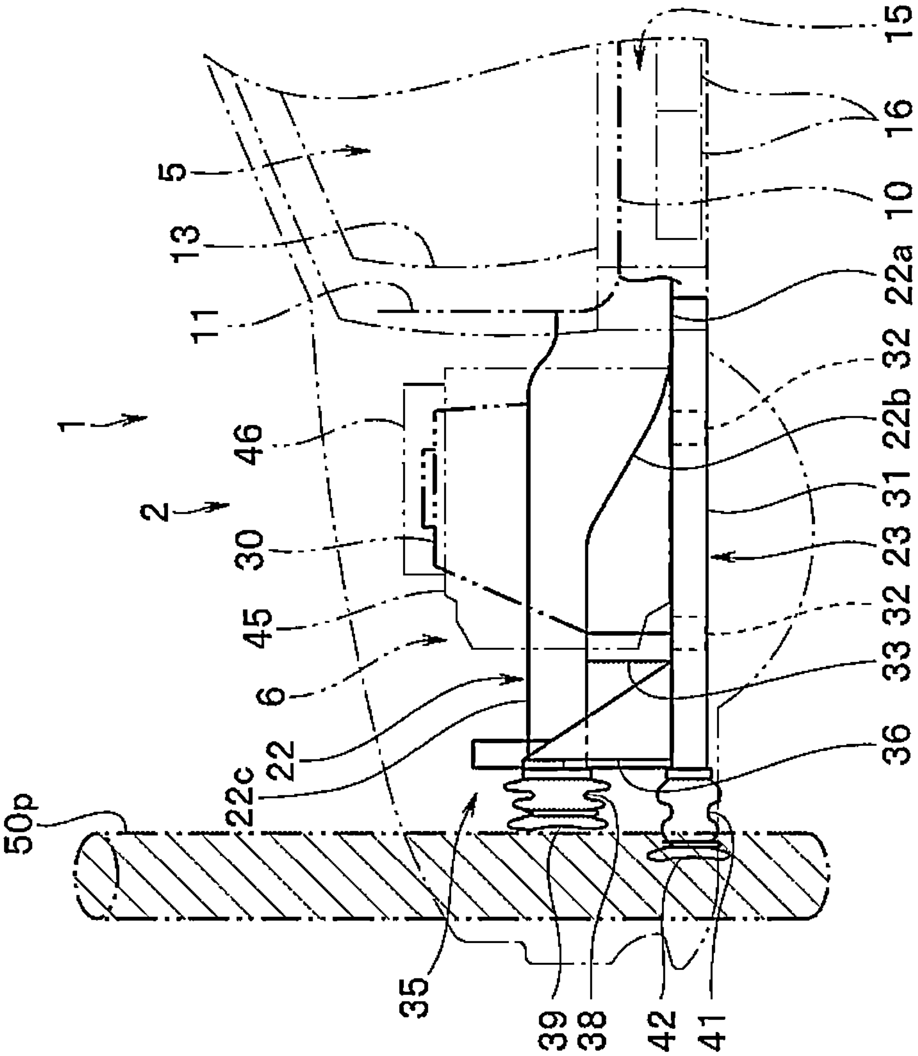
FIG. 10 is a side view illustrating a behavior of the vehicle body structure at an initial stage at a time of a small-wrap frontal collision.
Figure 11:
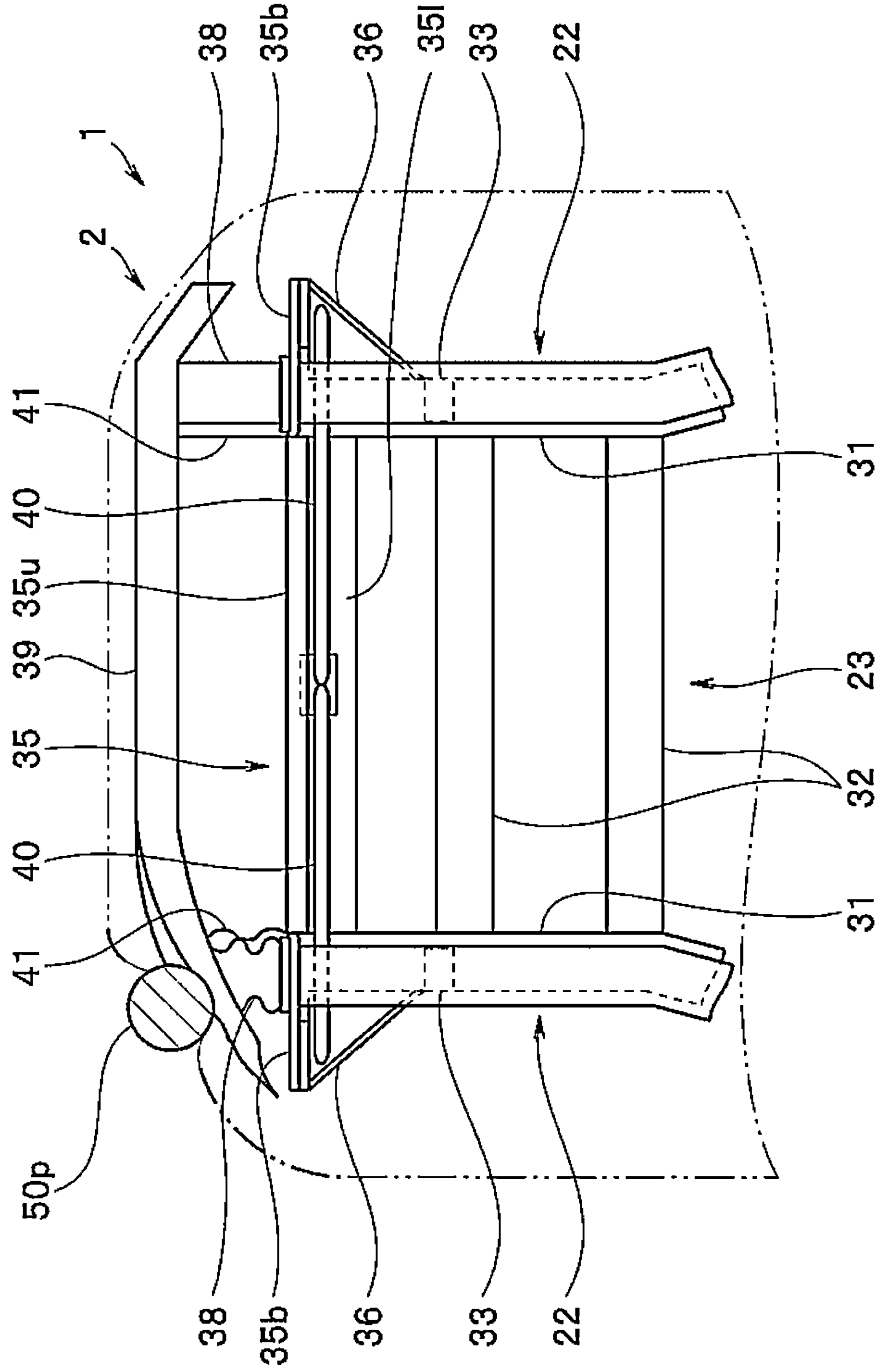
FIG. 11 is a plan view illustrating the behavior of the vehicle body structure at the initial stage at the time of the small-wrap frontal collision.

For example, as illustrated in FIGS. 10 and 11, at the initial stage of the small-wrap frontal collision, the bumper beam 39 and the first crash box 38 on the side collided with the obstacle 50*p* such as a pole are crushed. At the same time, the lip spoiler 42 and the second crash box 41 on the side where the obstacle 50*p* such as a pole collides are crushed.

Note that the second crash box 41 is disposed inside the first crash box 38 in the vehicle width direction. Therefore, depending on the collision position of the obstacle 50*p*, an amount of crushing of the first crash box 38 differs from an amount of crushing of the second crash box 41. In the examples illustrated in FIGS. 10 and 11, the amount of crushing of the second crash box 41 is relatively smaller than the amount of crushing of the first crash box 38.

Figure 12:
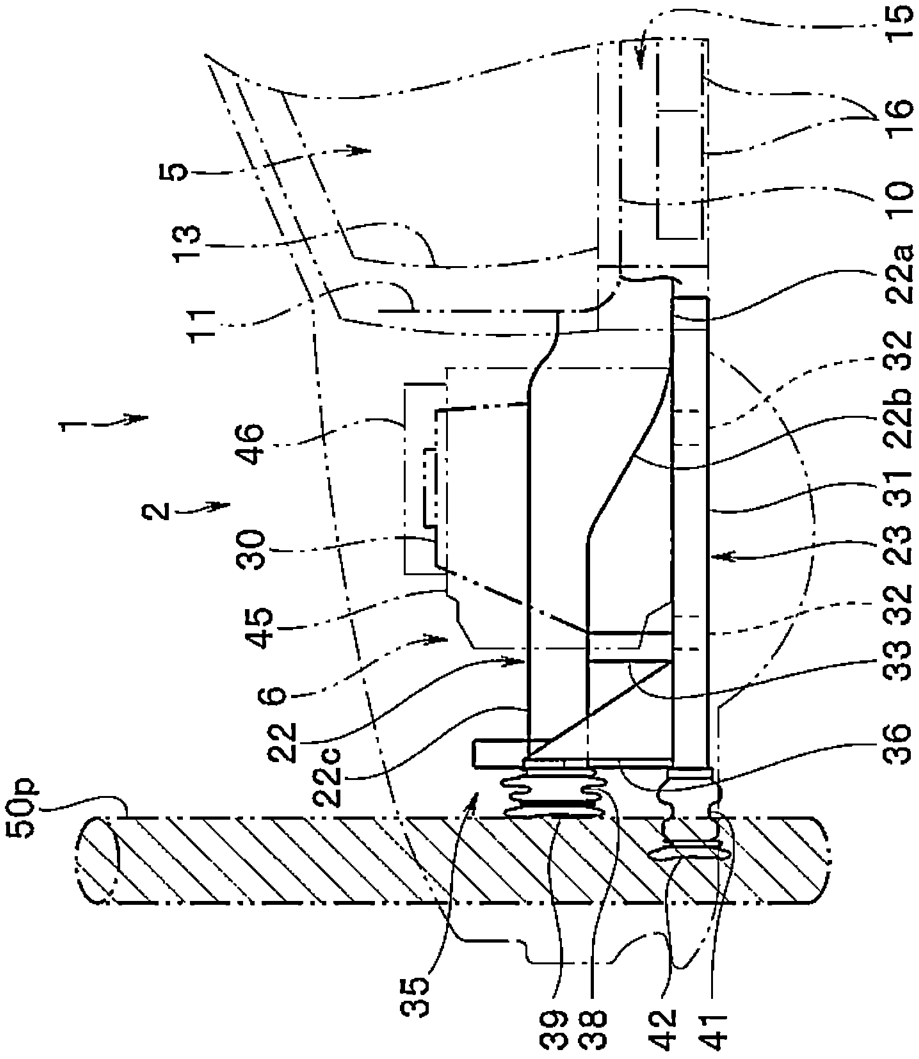
FIG. 12 is a side view illustrating a behavior of the vehicle body structure at a middle stage at the time of the small-wrap frontal collision.
Figure 13:
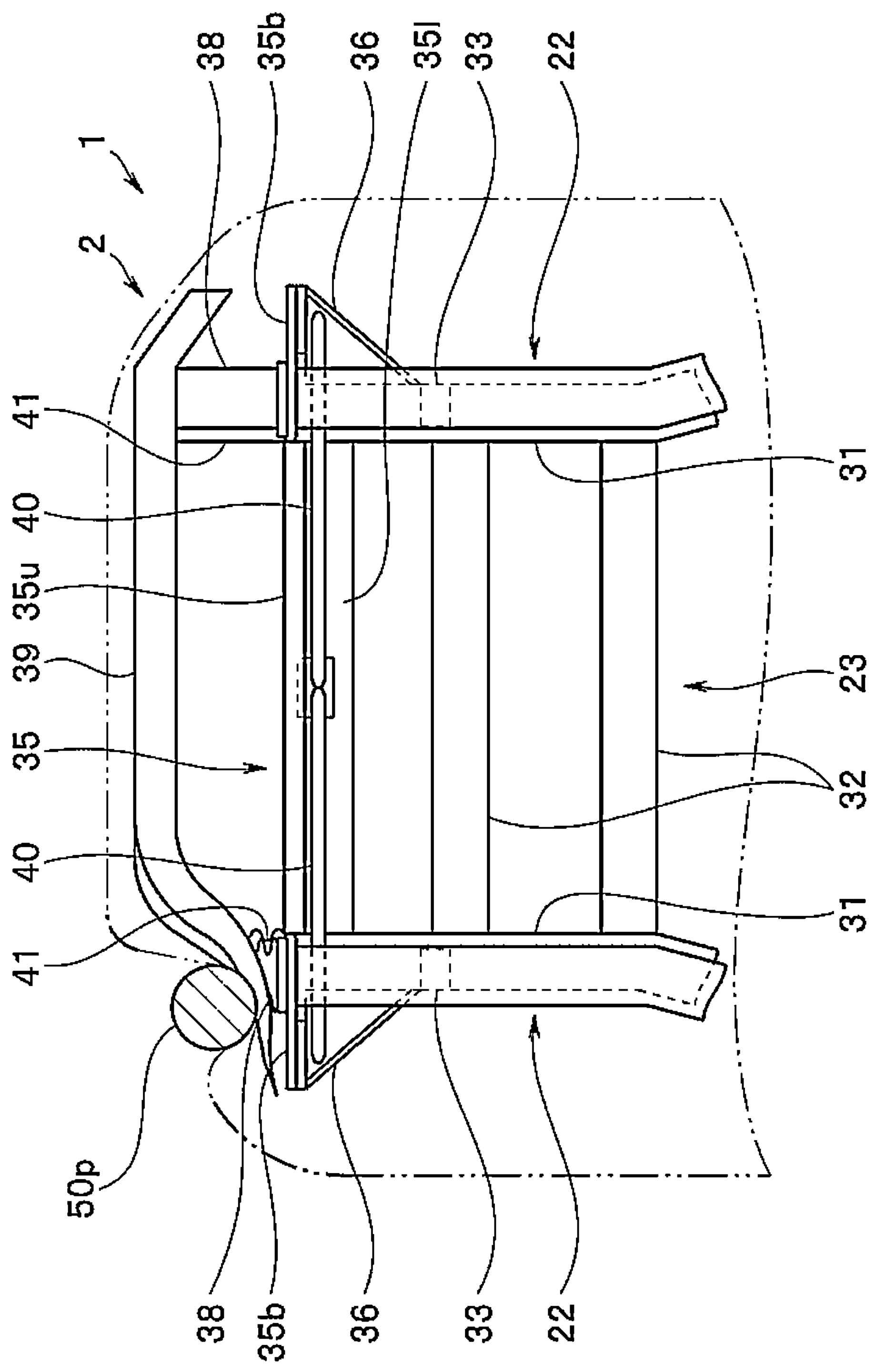
FIG. 13 is a plan view illustrating the behavior of the vehicle body structure at the middle stage at the time of the small-wrap frontal collision.

At a subsequent middle stage of the collision, for example, as illustrated in FIGS. 12 and 13, crushing of side ends of the bumper beam 39 and the lip spoiler 42 and crushing of the first and second crash boxes 38 and 41 proceed.

Figure 14:
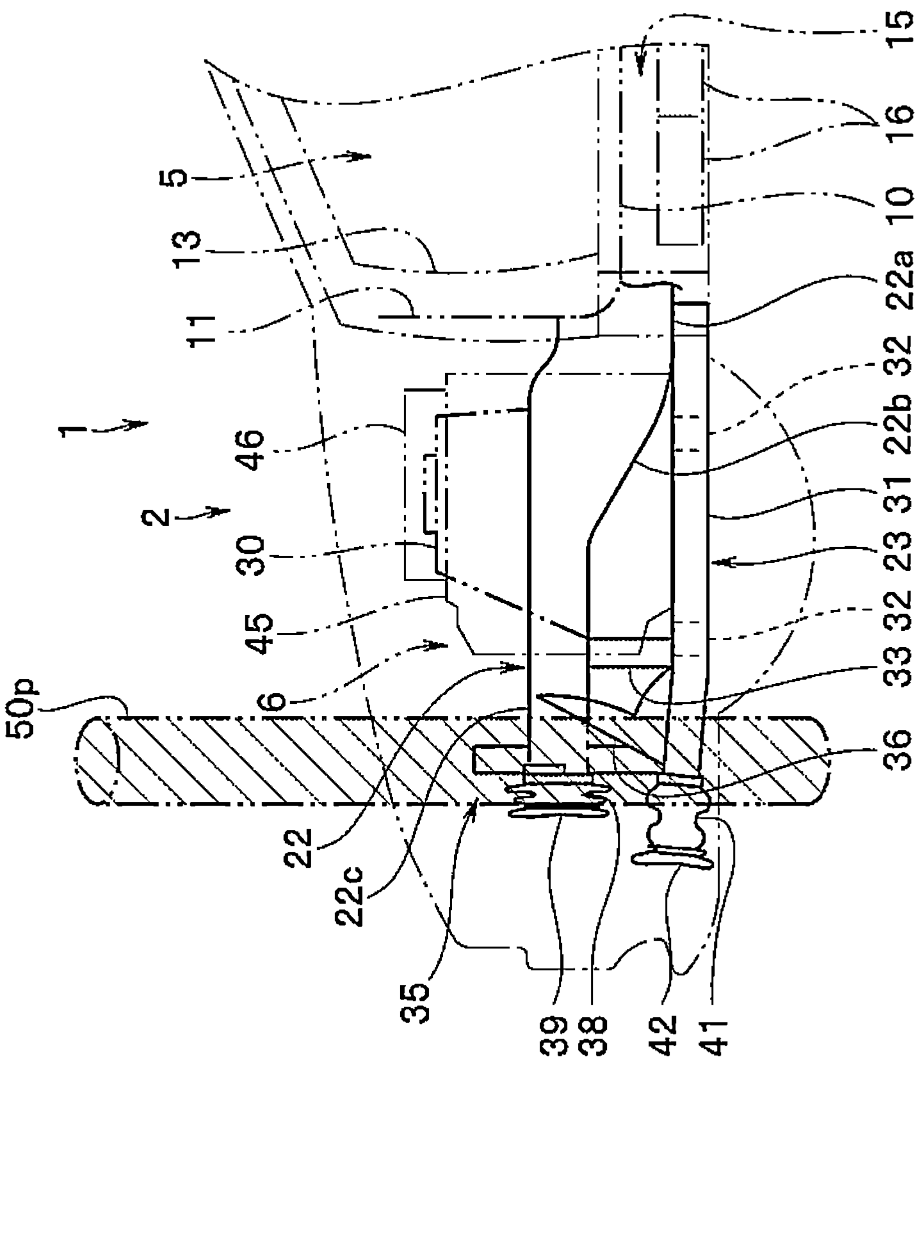
FIG. 14 is a side view illustrating a behavior of the vehicle body structure at a final stage of the small-wrap frontal collision.
Figure 15:
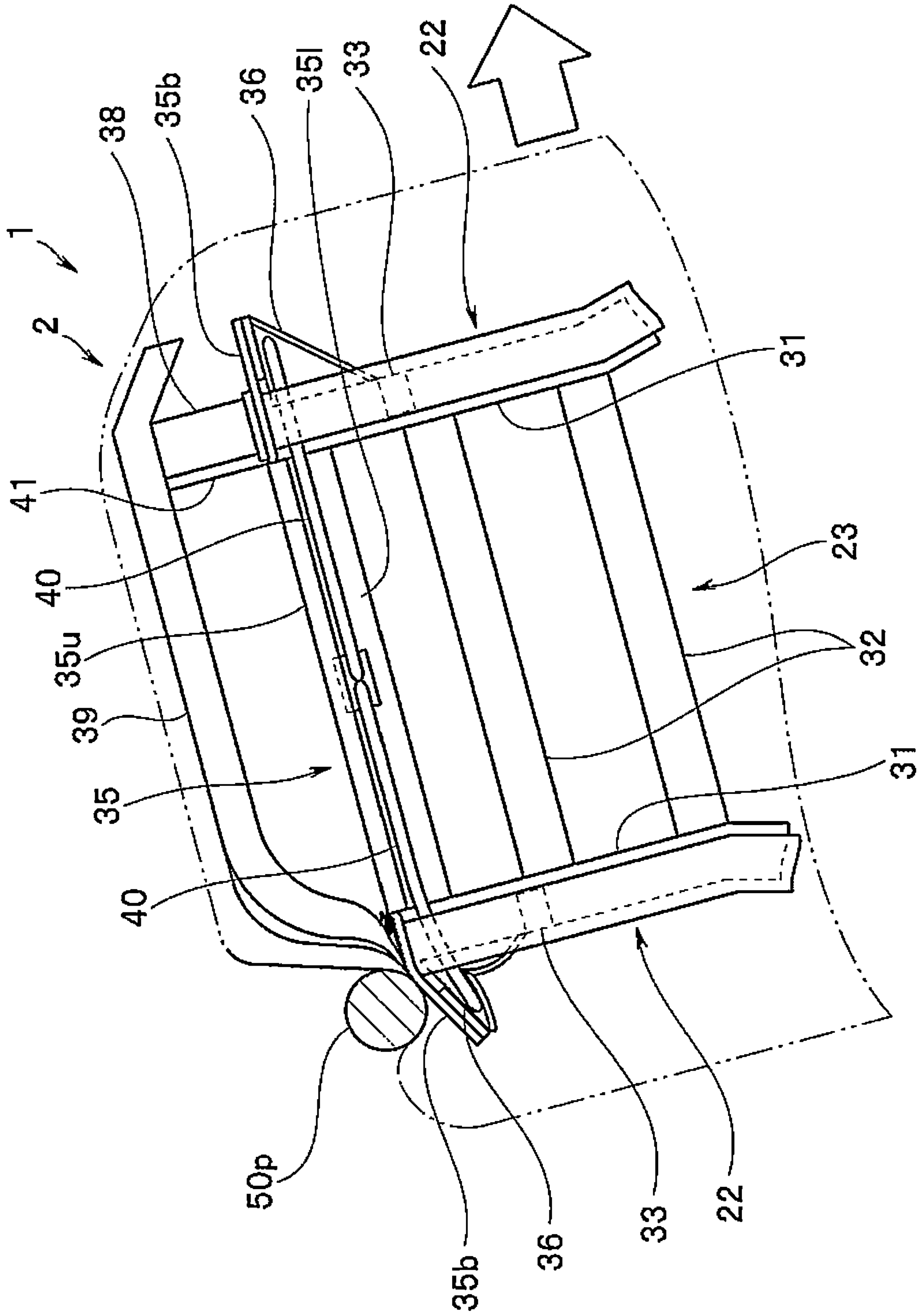
FIG. 15 is a plan view illustrating the behavior of the vehicle body structure at the final stage of the small-wrap frontal collision.

At a subsequent final stage of the collision, for example, as illustrated in FIGS. 14 and 15, the obstacle 50*p* reaches the vicinity of the front side frame 22, the lower side frame 31, and the inclined plate 36.

Here, the bottom side portion of the inclined plate 36 is fixed to the lower side frame 31 firmly coupled to the lower portion of the front side frame 22. Further, the top portion side of the inclined plate 36 is disposed outside the lower side frame 31 in the vehicle width direction. Thus, even if the obstacle 50*p* enters the vehicle body 2 in a state of being displaced outward in the vehicle width direction with respect to the lower side frame 31, the lower side frame 31 transmits the reaction force to the obstacle 50*p* via the inclined plate 36.

Thus, the inclined plate 36 is deformed while transmitting the reaction force from the lower side frame 31 to the obstacle. In this case, the inclined plate 36 has a triangular shape tapered from the bottom side to the top portion side. Therefore, when a collision load from the obstacle is input, the top portion side of the inclined plate 36 is deformed more than the bottom side. When the obstacle is guided by the inclined plate 36 deformed in this manner, the contact position between the obstacle 50*p* and the vehicle body 2 shifts outward in the vehicle width direction. Such shifting of the contact position causes a collision load that has not been absorbed by the first and second crash boxes 38 and 41 and the like to be converted into a yaw moment for rotating the vehicle body 2. For example, when the obstacle 50*p* collides with the left side portion of the vehicle body 2, a yaw moment in a direction in which the front portion of the vehicle body 2 is rotated to the right is generated in the vehicle body 2.

By generating such yaw moment by the inclined plate 36, the collision load transmitted from the obstacle 50*p* to the front side frame 22 and the lower side frame 31 is reduced. Thus, the front portions of the front side frame 22 and the lower side frame 31 are released from the collision load of the obstacle 50*p* without being greatly deformed.

According to such an embodiment, the vehicle body front structure includes the front side frame 22 extending in the front-rear direction of the vehicle body 2 in a side portion of the motor room 6, the lower side frame 31 extending in the front-rear direction of the vehicle body 2 below the front side frame 22, the first crash box 38 provided at the front end of the front side frame 22, the second crash box 41 provided at the front end of the lower side frame 31, and the inclined plate 36 fixed to the lower side frame 31 immediately behind the second crash box. The inclined plate 36 is inclined upward of the lower side frame 31 and outward in the vehicle width direction in a state where at least a part of a plate surface faces an outer surface of the front side frame 22 in the vehicle width direction. With these configurations, it is possible to suppress deformation of the motor room 6 in any collision of the full-wrap frontal collision and the small-wrap frontal collision.

That is, the vehicle body 2 includes the lower side frame 31 below the front side frame 22. Further, the vehicle body 2 also includes a first crash box 38 and a second crash box 41 provided at the front end of the front side frame 22 and the front end of the lower side frame 31, respectively. With these configurations, the vehicle body 2 can disperse and absorb collision loads in the event of a full-wrap frontal collision in the first crash box 38 and the second crash box 41. Thus, impact absorption in front of the motor room 6 can be efficiently performed, and deformation of the motor room 6 can be effectively suppressed.

Further, the vehicle body 2 also includes an inclined plate 36 fixed to the lower side frame 31 immediately behind the second crash box 41. Further, the inclined plate 36 is inclined upward of the lower side frame 31 and outward in the vehicle width direction in a state where at least a part of the plate surface faces the outer surface of the front side frame 22 in the vehicle width direction. With these configurations, even if the obstacle 50*p* enters the vehicle body 2 in a state of being displaced outward in the vehicle width direction with respect to the lower side frame 31, the lower side frame 31 can transmit the reaction force to the obstacle 50*p* via the inclined plate 36. Then, when the inclined plate 36 is deformed while transmitting the reaction force from the lower side frame 31 to the obstacle 50*p*, the inclined plate 36 shifts the contact position between the obstacle 50*p* and the vehicle body 2 outward in the vehicle width direction. Thus, the inclined plate 36 can convert a collision load not absorbed by the first and second crash boxes 38 and 41 and the like into a yaw moment of the vehicle body 2. Accordingly, transmission of a collision load to the motor room 6 can be suppressed, and deformation of the motor room 6 can be effectively suppressed.

In this case, the inclined plate 36 is a triangular plate, and a bottom side portion is fixed to the lower side frame 31. Thus, the inclined plate 36 can move the contact position between the obstacle 50*p* and the vehicle body 2 outward in the vehicle width direction by deforming the top portion side while transmitting the reaction force from the lower side frame 31 to the obstacle 50*p*.

Further, each lower side frame 31 also serves as a constituent member of the cradle 23 that supports the power unit 45 and the like in the motor room 6. Thus, the impact absorbing structure in the lower portion of the vehicle body 2 can be configured without increasing the number of components.

In this case, the front end of each lower side frame 31 is coupled to the radiator lower frame 351 constituting the radiator support 35. Accordingly, the lower side frame 31 can be stiffened without increasing the number of components.

Further, the radiator side frame 35*s* of the radiator support 35 supports the front end of the front side frame 22 and the upper end (top portion) of the inclined plate 36 via the bracket 35*b*. Accordingly, the front end portion of the front side frame 22 and the front end portion of the lower side frame 31 can be coupled with the inclined plate 36 and the bracket 35*b* interposed therebetween. In addition, the bottom side portion and the top portion of the inclined plate 36 can be fixed to the vehicle body 2, and vibration of the inclined plate 36 can be suppressed even during traveling.

The disclosure described in the above-described embodiment is not limited to the embodiment. In the stage of implementation, various modifications can be implemented within the scope not departing from the idea of the disclosure. Further, the above-described embodiment includes disclosures in various stages. Various disclosures can be extracted from appropriate combinations of the disclosed multiple components.

Further, for example, even though some components are deleted from all the components described in the embodiment, the configuration from which the components are deleted can be extracted as a disclosure as long as the described problem can be solved and the described effect can be obtained.

The invention claimed is:

1. A vehicle body front structure comprising:

a front side frame extending on a side of a power unit room in a front-rear direction of a vehicle body;

a lower side frame extending in the front-rear direction of the vehicle body below the front side frame;

a first crash box provided at a front end of the front side frame;

a second crash box provided at a front end of the lower side frame; and an inclined plate fixed to the lower side frame immediately behind the second crash box, wherein the inclined plate is inclined upward of the lower side frame and outward in a vehicle width direction in a state where at least a part of a plate surface of the inclined plate faces an outer surface of the front side frame in the vehicle width direction.

2. The vehicle body front structure according to claim 1, wherein the inclined plate is a triangular plate, and a bottom side portion of the triangular plate is fixed to the lower side frame.

3. The vehicle body front structure according to claim 1, further comprising a radiator support that holds a radiator is provided in front of the power unit room, wherein a front end of the lower side frame is coupled to a radiator lower frame constituting a lower portion of the radiator support.

4. The vehicle body front structure according to claim 3, wherein the front end of the front side frame and an upper end of the inclined plate are coupled to a radiator side frame constituting a side portion of the radiator support with a bracket interposed therebetween.

5. The vehicle body front structure according to claim 1, wherein the lower side frame is a support member that supports a power unit in the power unit room, and is coupled to the front side frame.

* * * * *